June 21, 1927.

S. R. HABAULT 1,632,791

VENTILATION OF WATER CLOSET PANS

Filed July 17, 1924  2 Sheets-Sheet 1

INVENTOR:
Sylvain René Habault
By Richards, Geier
Attys.

June 21, 1927.

S. R. HABAULT 1,632,791

VENTILATION OF WATER CLOSET PANS

Filed July 17, 1924        2 Sheets-Sheet 2

INVENTOR:
Sylvain René Habault
By Richards Geier
Attys.

Patented June 21, 1927.  1,632,791

UNITED STATES PATENT OFFICE.

SYLVAIN RENÉ HABAULT, OF NEUILLY-SUR-SEINE, FRANCE, ASSIGNOR TO SOCIETE D'HYGIENE PRATIQUE, OF PARIS, FRANCE, A CORPORATION OF FRANCE.

VENTILATION OF WATER-CLOSET PANS.

Application filed July 17, 1924, Serial No. 726,490, and in Belgium July 27, 1923.

The present invention has for its subject a device for effecting automatic internal ventilation of the pans of water closets after use by using an adjustable suction action which effects the discharge of the gases formed in the pan into the siphon itself or into the downflow of the siphon of the water closet. The return of the gases thus discharged into the pan is prevented, after the use of the apparatus, by the provision of a seal which may be hydraulic, mechanical or both, that is to say both hydraulic and mechanical.

In the accompanying drawings there are illustrated solely by way of example one form of construction according to the invention.

Figure 1:
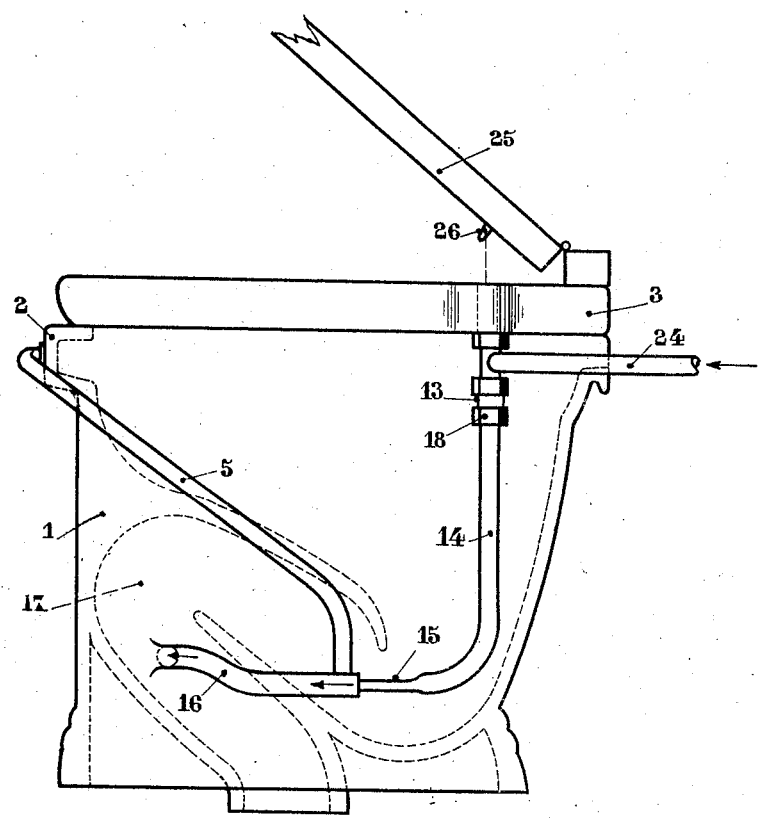
Fig. 1 shows a side elevation of a closet pan provided with a circular water supply.
Figure 2:
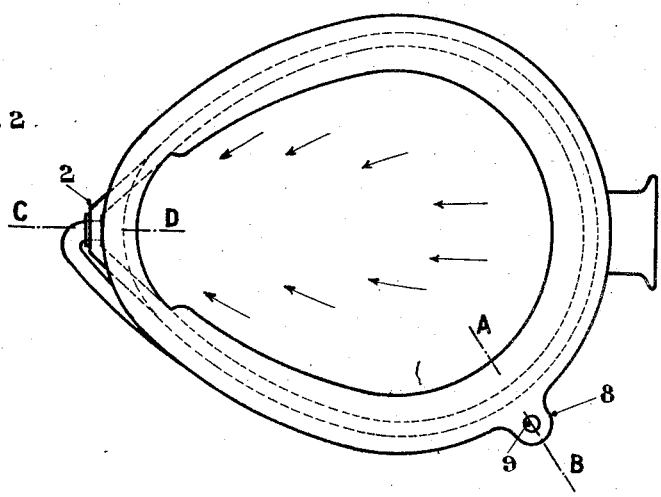
Fig. 2 is a plan of this pan.
Figure 3:
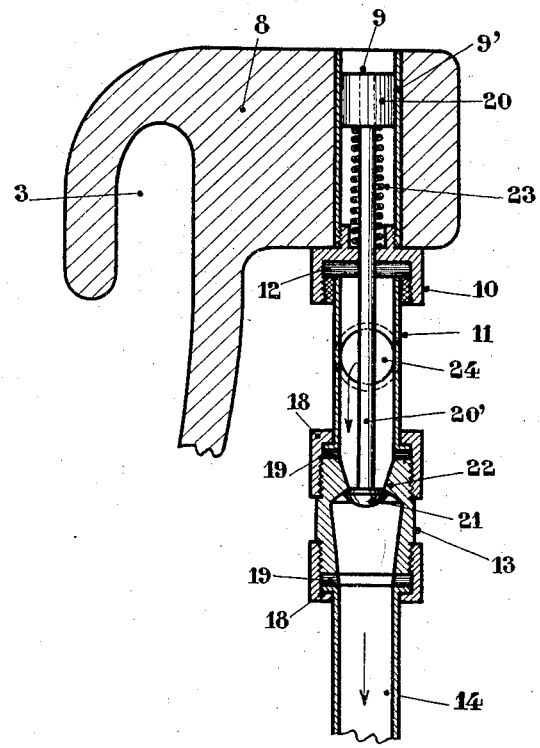
Fig. 3 is a section, to a larger scale, on the line A—B of Fig. 2.
Figure 4:
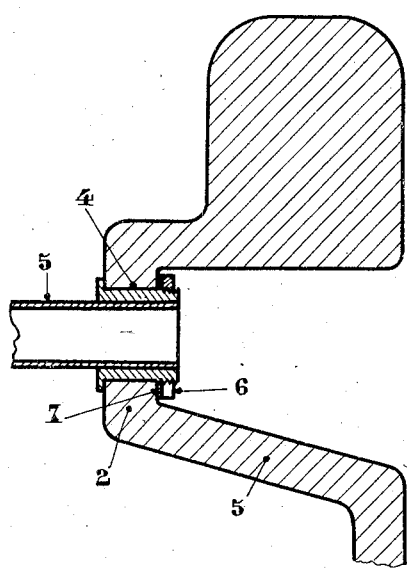
Fig. 4 is a vertical section, to a larger scale on the line C—D of Fig. 2.

As will be seen from the drawings the pan 1 is provided with a hollow boss 2 of suitable shape and dimensions moulded integrally with the body of the pan and disposed below the annular orifice 3 for the supply of water to the pan. The outer face of the boss 2 is provided with a hole 4 through which is passed a tube 5 secured to the boss by means of a nut 6; a washer 7 ensures a fluid-tight joint. A second boss 8, also moulded with the body of the pan 1, has a hole 9 extending the whole height thereof into which is fitted a calibrated tube 9' to the lower part of which is secured a short fitting 10 into which is fitted a tube 11, a fluid-tight joint being formed by a washer at 12. A fitting 13 connects to the tube 11 another tube 14 of which the end is connected by a portion of reduced section 15 to a tube of larger diameter 16 which leads into the siphon 17. The fitting 13 is connected to the tubes 11 and 14 by means of nuts 18 and packing washers 19, 19. In the tube 9', forming the body of a pump, is adapted to move a piston 20 of which the rod 20' is fitted at its lower end with a valve 21 adapted to co-operate with a seat 22 provided in the interior of the fitting 13. A spring 23 normally holds the valve 21 against its seat. A tube 24, leading from the water supply pipe which conducts the water from the cistern, terminates in the pipe 11 above the valve 22. After having passed through the first boss 2, the tube 5 passes into the tube 16 at the level of the orifice of the portion 15. The seat 25 is provided underneath with a projection 26 which, when the seat is lowered, comes into contact with the piston 20.

The operation of the apparatus shown in the drawings is as follows.

When pressure is exerted upon the seat 25 after it has been lowered the projection 26 pushes the rod 20' downwards thus removing the valve 21 from its seat 22. The water under pressure which normally fills the tubes 24 and 11, passes into the tube 14 and by reason of the reduced portion 15 enters the tube 16 opposite the orifice of the tube 5 at a high speed. It thus produces in the latter a vacuum which produces a suction in the pan 1 through the boss 2. As soon as the pressure on the seat 25 is relieved the spring 23 produces an upward movement of the piston 20 and thus closes the valve 21.

The inner walls of the suction orifice formed by the boss 2 are rigorously tangential to the inner edge of the pan, the applicant having found by experiment that this shape is the most favourable for the efficient operation of the apparatus.

The adjustment of the vacuum in the tube 5 may be obtained by any suitable means for example by means of a valve disposed in the pipe 24 before this enters the tube 11.

It will be understood that the invention is not limited to the method of construction above described and that the device may be modified in details of construction without effecting the scope of the invention. Thus for example the discharge orifice may be disposed in the same plane as the water supply orifice instead of being below this. Moreover the various tubes which are used in the construction of the device may be moulded in the body of the pan instead of being attached separately thereto. The device producing the vacuum may also be connected indirectly to the main water supply instead of directly. Finally its operation need not be automatic.

The device forming the subject of the present invention permits of effecting, automatically or non-automatically, a complete discharge of the gases from the pan, these gases being discharged by the water into the siphon of the apparatus. This ventilation of the pan is independent of the water discharge with which it may be formed simultaneously at the start.

Having thus described my invention what I claim as new and desire to secure by Letters Patent is:—

1. In a device for effecting the automatic internal ventilation of a closet pan, the combination with a pan having a siphon in the bottom thereof; of an apertured boss integral with the top of said pan, the inner walls of said boss being arranged tangentially to the inner surface of the pan, an outlet pipe connected to said boss and siphon, a valve casing, a normally closed valve therein, means to open said valve when the seat of the pan is lowered, water supply means for supplying water to said casing when said valve is opened, and a discharge tube connected to said casing and to said outlet pipe and through which the water flows from said casing to create a suction in said outlet pipe.

2. A device for automatically ventilating the interior of a closet pan comprising in combination with a pan having a discharge siphon communicating with the bottom thereof, an annular water supply at the top thereof and a seat hinged thereto, of a boss moulded integral with the pan and having the inner walls thereof tangential to the inner surface of the pan, a second boss formed on said pan, a piston cylinder in said second boss, a piston mounted in said cylinder, a piston rod on said piston, a valve carried by said piston rod, a valve casing having a seat for said valve, a spring acting on said piston and adapted normally to hold the valve closed against its seat, a water supply pipe communicating with said valve casing, a tube communicating with the siphon, a second tube leading from the first boss to the first named tube, a third tube communicating with the valve chamber, said third tube having a reduced portion which enters the said first named tube adjacent the point of connection of the said second tube therewith and means whereby the valve is opened when the seat is lowered.

3. A device for automatically ventilating the interior of a closet pan comprising in combination with a pan having a discharge siphon communicating with the bottom thereof, an annular water supply at the top thereof and a seat hinged thereto, of a boss moulded integral with the pan and having the inner walls thereof tangential to the inner surface of the pan, a second boss formed on said pan, a piston cylinder in said second boss, a piston mounted in said cylinder, a piston rod on said piston, a valve carried by said piston rod, a valve casing having a seat for said valve, a spring acting on said piston and adapted normally to hold the valve closed against its seat, a water supply pipe communicating with said valve casing, a tube communicating with the siphon, a second tube leading from the first boss to the first named tube, a third tube communicating with the valve chamber, said third tube having a reduced portion which enters the said first named tube adjacent the point of connection of the said second tube therewith and a projection on the seat, said projection, when the seat is lowered, being adapted to depress the piston against the action of the spring so as to open the valve, whereby water rushes past the valve and by reason of the reduced portion of said third tube produces a suction action in said second tube whereby the gases are withdrawn from the pan and discharged into the siphon, whereupon after pressure is relieved on the seat the spring returns the piston to its normal position and thus closes the valve.

4. A device for automatically ventilating the interior of closet pans after use comprising a hollow boss moulded integral with the pan and having its inner walls formed tangential to the inner surface of the pan, a valve casing, a valve fitted therein, means normally holding said valve closed, means adapted to open said valve when the seat of the pan is lowered, means whereby when the valve is opened a suction action is produced in the boss so as to withdraw the gases from the pan, means for conveying said gases to said siphon, and means whereby the suction action can be adjusted, said means consisting of a valve mounted on the water supply pipe.

SYLVAIN RENÉ HABAULT.